United States Patent
Zhang et al.

(10) Patent No.: US 9,098,105 B2
(45) Date of Patent: Aug. 4, 2015

(54) DYNAMIC Y-BUFFER SIZE ADJUSTMENT FOR RETAINED SECTOR REPROCESSING

(75) Inventors: Fan Zhang, Milpitas, CA (US); Yang Han, Sunnyvale, CA (US); Weijun Tan, Longmont, CO (US); Shaohua Yang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 400 days.

(21) Appl. No.: 13/593,648

(22) Filed: Aug. 24, 2012

(65) Prior Publication Data

US 2014/0059377 A1 Feb. 27, 2014

(51) Int. Cl.
*G06F 3/00* (2006.01)
*G11B 20/10* (2006.01)

(52) U.S. Cl.
CPC ............ *G06F 3/00* (2013.01); *G11B 20/10527* (2013.01)

(58) Field of Classification Search
CPC .............. H04L 1/1835; H04L 49/9047; H04L 2012/5681; H04L 49/9052; H04L 1/1874; H04L 49/9005
USPC ...................... 714/16, 6.13; 710/56
See application file for complete search history.

(56) References Cited

U.S. PATENT DOCUMENTS

| | | | |
|---|---|---|---|
| 5,793,724 A * | 8/1998 | Ichikawa et al. | 369/47.31 |
| 6,088,307 A * | 7/2000 | Fushimi et al. | 369/44.13 |
| 6,188,699 B1 * | 2/2001 | Lang et al. | 370/463 |
| 6,282,367 B1 * | 8/2001 | Cho et al. | 386/334 |
| 6,295,176 B1 * | 9/2001 | Reddy et al. | 360/48 |
| 6,452,990 B1 * | 9/2002 | Leis et al. | 375/361 |
| 6,697,977 B2 * | 2/2004 | Ozaki | 714/710 |
| 7,085,087 B2 * | 8/2006 | Fukuhisa et al. | 360/55 |
| 8,219,886 B1 * | 7/2012 | Sutardja et al. | 714/768 |
| 8,537,482 B1 * | 9/2013 | Song et al. | 360/39 |
| 8,612,798 B1 * | 12/2013 | Tsai | 714/6.13 |
| 8,886,991 B2 * | 11/2014 | Zhang et al. | 714/6.13 |
| 2003/0043647 A1 * | 3/2003 | Kanamori et al. | 365/200 |
| 2003/0061552 A1 * | 3/2003 | Su et al. | 714/708 |
| 2005/0144542 A1 * | 6/2005 | Minagawa et al. | 714/54 |
| 2007/0113143 A1 * | 5/2007 | Liao et al. | 714/753 |
| 2007/0245214 A1 * | 10/2007 | Ramamoorthy | 714/758 |
| 2008/0172547 A1 * | 7/2008 | Piry et al. | 712/205 |
| 2009/0304366 A1 * | 12/2009 | Kudavelly | 386/126 |
| 2009/0327861 A1 * | 12/2009 | Coulson et al. | 715/234 |
| 2010/0064198 A1 * | 3/2010 | Yoshida et al. | 714/755 |
| 2010/0238779 A1 * | 9/2010 | Chen et al. | 369/53.42 |
| 2012/0127604 A1 * | 5/2012 | Takada et al. | 360/75 |
| 2013/0031301 A1 * | 1/2013 | Barndt | 711/103 |
| 2013/0094455 A1 * | 4/2013 | Wu et al. | 370/329 |
| 2013/0215745 A1 * | 8/2013 | Shubhakoti et al. | 370/235 |
| 2013/0238944 A1 * | 9/2013 | Ratnakar Aravind et al. | 714/49 |
| 2013/0297983 A1 * | 11/2013 | Wang et al. | 714/752 |
| 2013/0332794 A1 * | 12/2013 | Yen et al. | 714/758 |
| 2013/0343495 A1 * | 12/2013 | Han et al. | 375/341 |
| 2014/0032999 A1 * | 1/2014 | Zhang et al. | 714/799 |
| 2014/0068368 A1 * | 3/2014 | Zhang et al. | 714/752 |

* cited by examiner

*Primary Examiner* — Loan L. T. Truong
(74) *Attorney, Agent, or Firm* — Hamilton DeSanctis & Cha

(57) ABSTRACT

Aspects of the disclosure pertain to a system and method for providing dynamic y-buffer size adjustment for retained sector reprocessing (RSR). The system and method implement dynamic y-buffer size adjustment for RSR for promoting improved Sector Failure Rate (SFR) performance of the system. The system is a read channel system.

15 Claims, 1 Drawing Sheet

DYNAMIC Y-BUFFER SIZE ADJUSTMENT FOR RETAINED SECTOR REPROCESSING

BACKGROUND

A read channel is a circuit in a disk drive which: 1) encodes data bits into magnetic flux changes for recording; and 2) decodes magnetic flux changes into bits for reading. Current read channel systems can suffer from performance issues.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing dynamic y-buffer size adjustment for retained sector reprocessing (RSR). The system and method implement dynamic y-buffer size adjustment for RSR for promoting improved Sector Failure Rate (SFR) performance of the system.

BRIEF DESCRIPTION OF THE DRAWINGS

The numerous advantages of the present invention may be better understood by those skilled in the art by reference to the accompanying figures in which.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

A read channel is a circuit in a disk drive which: 1) encodes data bits into magnetic flux changes for recording; and 2) decodes magnetic flux changes into bits for reading. A read channel system can perform retained sector reprocessing (RSR) when processing sectors of data. In a typical read channel system, a data buffer, such as a Y-buffer, can be implemented for temporarily storing data (e.g., sectors) received by the read channel system.

In the typical read channel system performing typical RSR, the Y-buffer can be dynamically shared between in-order sectors and retained sectors. For example, in the typical read channel system, the Y-buffer can hold up to a total of seven, 4-kilobyte (4 KB) sectors, with up to two of those seven, 4 KB sectors being retained sectors. However, in the normal stage of signal processing of 4 KB sectors by the typical read channel system performing typical RSR, the Y-buffer can become a bottleneck for system performance for the 4 KB sectors. For example, in the typical read channel system performing typical RSR, Y-buffer management is such that the Y-buffer does not adapt to different-sized tracks of data, thereby causing degradation of the Sector Failure Rate (SFR) performance of the read channel system.

As more fully set forth below, aspects of the disclosure include a system and method for promoting improved SFR performance (e.g., between 1e-1 to 1e-4) during RSR by dynamically adjusting management rules for a Y-buffer of the system according to data track size.

Figure 1:
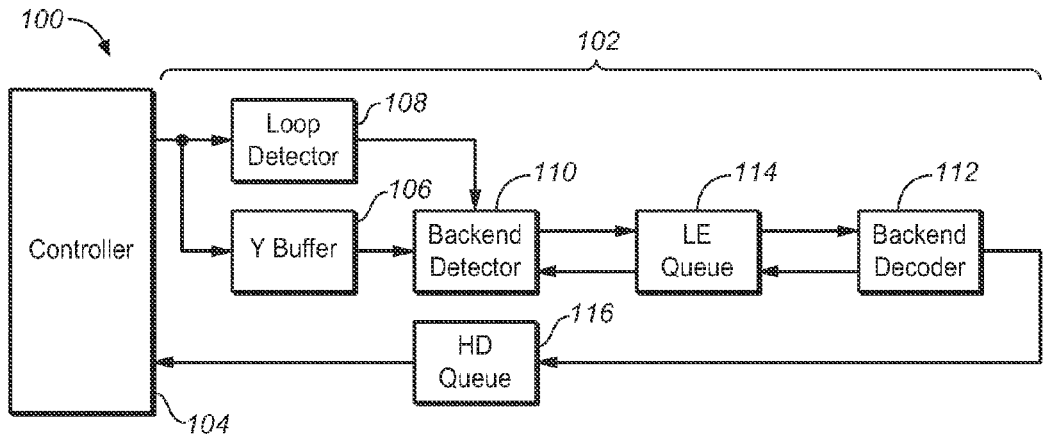
FIG. 1 is an example conceptual block diagram schematic of a read channel system.
Figure 3:
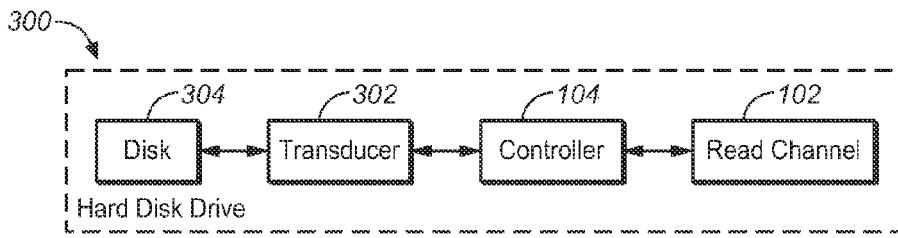
FIG. 3 is an example conceptual block diagram schematic of a disk drive system including a read channel system.

As indicated in FIG. 1 (FIG. 1), a system 100 is shown. In embodiments, the system 100 is a read channel system. Further, the system 100 can be an iterative codec system architecture. Still further, the system 100 can be a read channel backend codec system architecture. Further, the system 100 can be implemented in a hard disk drive system 300 (as shown in FIG. 3). In embodiments, the system 100 includes a read channel 102 (e.g., a read channel backend, a read channel backend codec). The read channel 102 is a circuit (e.g., an integrated circuit, an electrical circuit) implemented in a disk drive which: 1) encodes data bits into magnetic flux changes for recording; and 2) decodes magnetic flux changes into bits for reading. Still further, the read channel 102 can be a single chip or can be integrated as part of a system on chip (SoC).

In embodiments, the system 100 includes a controller 104. The controller 104 is connected to (e.g., communicatively coupled with) the read channel 102. For example, the controller 104 is connected to the read channel 102 (e.g., read channel backend codec) via an analog front end (e.g., read channel analog front end). In embodiments, the controller 104 is a disk controller. The controller 104 is configured for transferring data and signals (e.g., control signals) between the read channel 102 and a host system during read and write operations. For example, the controller 104 is configured for being connected to a head transducer (e.g., read-write head) 302 of the hard disk drive system 300. During read operations, the head transducer is configured for reading data from a disk (e.g., a disk platter of a hard disk drive (HDD)) 304 and providing the read data to the controller 104. The controller 104 is configured for provide the read data received from the head transducer 302 to the read channel 102. During write operations, the read channel 102 is configured for providing write data to the controller 104, the controller 104 is configured for providing the write data received from the read channel 102 to the head transducer 302, and the head transducer 302 is configured for writing the write data received from the controller 104 to the disk.

In embodiments, the controller 104 is configured for managing (e.g., controlling) a position of the head transducer 302. For example, during read operations, the controller 104 is configured for selecting a track to be read and for causing the head transducer 302: a.) to move (e.g., change its a position) relative to the disk 304, such that the head transducer 302 is aligned to read the controller-selected track; and b.) to read the controller-selected track of data from the disk 304. The head transducer 302 provides the read data from the controller-selected track to the controller 104, the controller 104 then provides the read data from the controller-selected track to the read channel 102. The read data received by the read channel (e.g., read channel backend codec) via the controller 104 is digital data which is encoded.

Further, the controller 104 is configured for: selecting a next (e.g., second) track to be read; causing the head transducer 302 to move to a new position relative to the disk 304; causing the head transducer 302 to read data from the second selected track and to transmit the read data to the controller 104; receiving the transmitted read data from the second selected track; and transmitting the received read data from the second selected track to the read channel 102. The above described transition process the system 100 undergoes as the controller 104 transitions from receiving the read data from the first selected track to receiving read data from the second selected track is a process known as track switching. Latency is associated with this track switching process (e.g., track switching latency).

As mentioned above, the controller 104 is configured for receiving read data from the head transducer 302 and for transmitting the received read data to the read channel 102. For example, the controller 104 is configured for transmitting a plurality of sectors (e.g., a track) of read data to the read channel 102, the plurality of sectors having been read from the disk 304. The read channel 102 is configured for processing the plurality of sectors of read data received from the controller 104. For example, when the system 100 is operating in normal mode, each of the plurality of sectors received by the read channel 102 can be processed via 28 global iterations and 10 local iterations per global iteration. In embodiments, the controller 104 implements (e.g., includes) a client-server based scheduler for accommodating concurrent processing of the plurality of sectors. The client-server based scheduler can be implemented as hardware, firmware, software or a combination thereof.

In embodiments, the system 100 is configured for performing retained sector reprocessing (RSR). For example, after the plurality of sectors is processed by the read channel 102, the processed sectors are provided (e.g., transmitted) from the read channel 102 to the controller 104. The controller 104 is configured for identifying (e.g., classifying) each sector included in the plurality of processed sectors as being either: a.) normal (e.g., in-order); or b.) failed. If one or more sectors included in the plurality of processed sectors are identified by the controller 104 as being in-order, the controller 104 is configured for determining that no further processing of the one or more in-order sectors by the read channel 102 is needed. However, if one or more sectors included in the plurality of processed sectors are identified by the controller 104 as being failed, the controller 104 (e.g., via the scheduler) is configured for saving y-samples corresponding to the one or more failed sectors (e.g., retained sectors) and for scheduling and initiating reprocessing of the failed (e.g., retained) sectors by the read channel 102. For example, the retained sectors can be reprocessed by the read channel 102 via 180 global iterations (for 512 bytes (512 B)) or 37 global iterations (for 4 KB) and 20 local iterations per global iteration. RSR can provide a performance gain (e.g., 0.05 to 0.15 dB, depending on conditions) for the system 100 via the extra global and local iterations on the retained sectors.

The system 100, as mentioned above, during track switching, undergoes a transition as the controller 104 transitions from receiving the read data (e.g., sectors) from the first selected track to receiving read data (e.g., sectors) from the second selected track. The latency associated with track switching provides a window of time for the read channel 102 to reprocess the retained sectors (e.g., failed sectors) of the first selected track and to transmit those reprocessed sectors to the controller 104 before reading of data (e.g., sectors) from the second selected track occurs (e.g., before the controller 104 receives read data from the second selected track). As mentioned above, the controller 104 (via the scheduler) is configured for scheduling reprocessing of the failed sectors by the read channel 102 during the above-referenced track switching latency time window.

In embodiments, a size of a track of read data is equivalent to a number of sectors of that track which the controller 104 obtains, via the head transducer 302, during a consecutive read. Track size can be highly application-dependent and can vary from tens (10s) to thousands (1000s) of sectors per track.

The read channel 102 includes a buffer 106, which is connected to the controller 104. For example, the buffer 106 is a Y-buffer. The buffer 106 is a memory which is temporarily used for storing input or output data. For instance, the buffer 106 is configured for receiving read data (e.g., sectors) from the controller 104.

In embodiments, the read channel 102 includes a first detector 108, which is connected to the controller 104. For example, the first detector 108 is a loop detector. The first detector 108 is configured for receiving a signal (e.g., data, information). For instance, the first detector 108 is configured for receiving one or more signals (e.g., information) from the controller 104, the one or more signals corresponding to the read data (e.g., sectors) provided from the controller 104 to the buffer 106. For example, the controller 104 is configured for providing the one or more signals to the first detector 108 in parallel with providing the read data to the buffer 106.

In embodiments, the read channel 102 further includes a second detector 110, which is connected to both the first detector (e.g., the loop detector) 108 and the buffer (e.g., Y-buffer) 106. For example, the second detector 110 is a backend detector. The second detector 110 is configured for receiving the read data via the buffer 106. The second detector 110 is further configured for receiving the signals (e.g., information) corresponding to the read data via the first detector 108.

In embodiments, the read channel 102 further includes a decoder 112, which is connected to the second detector (e.g., the backend detector) 110. For example, the decoder 112 is a backend decoder. Further, the decoder 112 is connected to the controller 104. The decoder 112 is configured for receiving the read data. Further, the decoder 112 is configured for receiving the signals (e.g., information) corresponding to the read data. For instance, the read data provided from the controller 104 is routed via the buffer 106 and the second detector 110 to the decoder 112. Further, the signals (e.g., information) corresponding to the read data are routed via the first detector 108 and the second detector 110 to the decoder 112. For example, the read data and the signals corresponding to the read data are combined at the second detector 110 and routed from the second detector 110 to the decoder 112 as a first queue (e.g., LE queue) 114. The decoder 112 is configured for processing (e.g., decoding) the read data (e.g., sectors) and for providing the processed read data to the controller 104. For example, the processed read data is provided to the controller 104 as a second queue (e.g., Hard Drive (HD) queue) 116.

In embodiments, the controller 104 is configured for dynamically determining and adjusting a size of a portion of the buffer (e.g., Y-buffer) 106 that is to be used (e.g., allocated) for storing failed sectors. The controller 104 is configured for dynamically determining and adjusting the size of the portion of the failed sector storage portion of the buffer 106 based upon a size of the track of read data. For example, when the track of data includes a number of sectors which is equal to K, the scheduler implemented by the controller 104 is configured for determining that the track includes K sectors and is configured for buffering up to min(floor(K/1000)+2, 4) sectors of the track (for 512 B) or buffering up to min(floor (K/200+1),2) sectors of the track (for 4 KB). By buffering up to min(floor(K/1000)+2, 4) sectors of the track (for 512 B), or buffering up to min(floor(K/200+1), 2) sectors of the track (for 4 KB), the scheduler implemented by the controller 104 allows the SFR curve below 1e-4 to not be affected, since it is very unlikely that there are more than 2 sectors (for 512 B) or 1 sector (for 4 KB) failed when track size is around 1000 (for 512 B) or 200 (for 4 KB) when SFR=1e-4. The minimum of 4 (for 512 B) or 2 (for 4 KB) can be taken, because the physical extra Y-buffer added for RSR is 4 (for 512 B) or 2 (for 4 KB). Avoiding degradation of the performance of normal stage is a priority. When track size is small (e.g., typical track size for a 4K sector is around 200), the disclosed scheme allows the buffer 106 to hold up to seven normal (e.g., in-order) sectors. By dynamically decreasing the size of the portion of the buffer 106 allocated for storing retained (e.g., failed) sectors when the track size is small, the system 100 is configured for providing 0.05 to 0.08 decibels (dB) of Signal-to-Noise Ratio (SNR) gain on SFR, and is configured for improving SFR performance between 1e-1 to 1e-4. The optimal number of failed sectors buffered by the system 100 is adaptive based upon track size.

Figure 2:
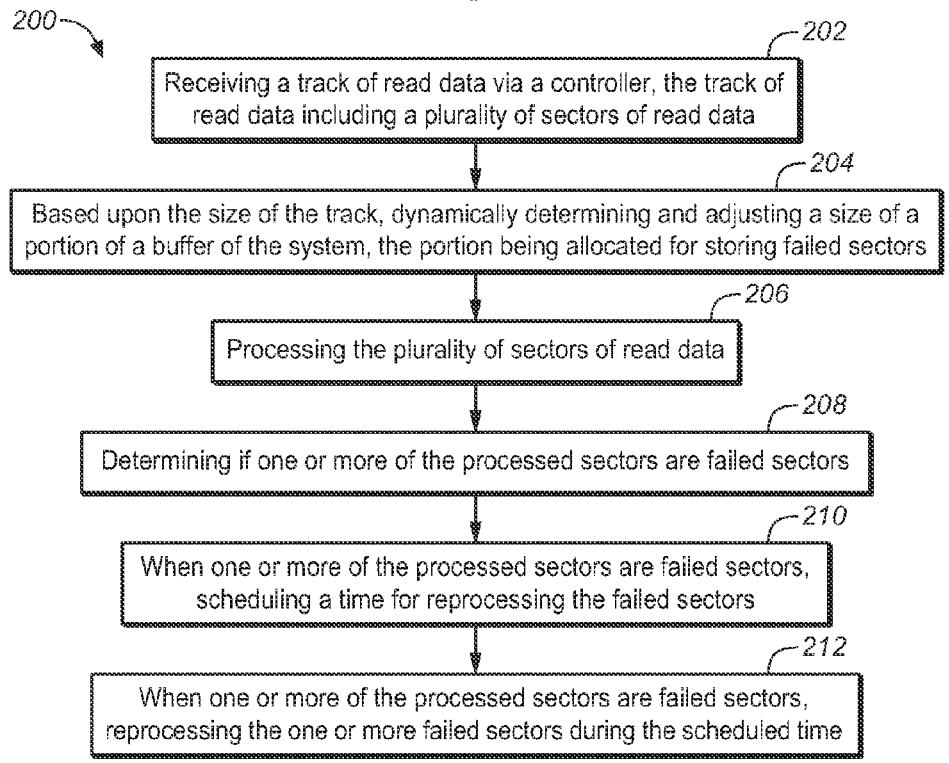
FIG. 2 is a flow chart illustrating a method for routing data in a read channel system.

FIG. 2 is a flowchart illustrating a method for data routing in a read channel system. The method 200 includes the step of receiving a track of read data via a controller of the system, the track of read data including a plurality of sectors of read data 202. The method 200 further includes the step of, based upon a size of the track of read data, dynamically determining and adjusting a size of a portion of a buffer of the system, the portion being allocated for storing failed sectors included in the plurality of sectors of read data 204. For example, the controller 104 is configured for dynamically determining and adjusting a size of a portion of a buffer of the system 100. The method further includes the step of processing the plurality of sectors of read data 206. For instance, the read channel 102 is configured for processing the plurality of sectors of read data.

The method 200 further includes the step of determining if one or more of the processed sectors are failed sectors 208. For example, the controller 104 is configured for determining if one or more of the processed sectors are failed sectors. The method 200 further includes the step of, when one or more of the processed sectors are failed sectors, scheduling a time for reprocessing the failed sectors 210. For instance, the controller 104 is configured for scheduling reprocessing of failed sectors. For example, reprocessing is scheduled to occur during a track switching window of the controller 104. The method 200 further includes the step of, when one or more of the processed sectors are failed sectors, reprocessing the one or more failed sectors during the scheduled time 212. For example, the read channel 102 is configured for reprocessing the one or more failed sectors during the scheduled time.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A read channel system, comprising:
a controller, the controller configured for receiving a track of read data, the track of read data including a plurality of sectors of read data;
a buffer, the buffer being connected to the controller, the buffer configured for receiving the plurality of sectors of read data from the controller; and
a decoder, the decoder being connected to the buffer, the decoder configured for receiving the plurality of sectors of read data from the buffer, the decoder configured for processing the plurality of sectors of read data and transmitting the processed sectors of read data to the controller, the controller configured for determining if one or more of the processed sectors are failed, and when one or more of the processed sectors are determined as being failed, the controller is configured for scheduling and initiating reprocessing of the failed sectors;
a first detector, the first detector being connected to the controller, the first detector configured for receiving signals corresponding to the plurality of sectors of read data;
a second detector, the second detector being connected to the first detector and the buffer, wherein the plurality of sectors of read data are routed from the buffer to the decoder via the second detector; and
wherein the controller is configured for, based upon the size of the track of read data, dynamically determining an amount of space of the buffer which is to be allocated for storing the failed sectors.

2. The read channel system as claimed in claim 1, wherein the controller implements a scheduler for dynamically adjusting the size of the space of the buffer allocated for storing the failed sectors.

3. The read channel system as claimed in claim 2, wherein the scheduler assigns a time for reprocessing the failed sectors and initiates the reprocessing of the failed sectors at the assigned time.

4. The read channel system as claimed in claim 3, wherein the scheduler implemented by the controller is a client-server based scheduler.

5. The read channel system as claimed in claim 3, wherein the assigned reprocessing time occurs during a track switching window for the controller.

6. The read channel system as claimed in claim 1, wherein the read channel system is a read channel backend codec system.

7. The read channel system as claimed in claim 1, wherein the first detector is a loop detector.

8. The read channel system as claimed in claim 1, wherein the buffer is a Y-buffer.

9. A system, the system comprising:
a controller;
a buffer operable to receive a plurality of sectors of read data from a track of read data, wherein the buffer is communicably coupled to the controller;

a first detector, the first detector being connected to the controller, the first detector configured for receiving signals corresponding to the plurality of sectors of read data;

a second detector, the second detector being connected to the first detector and the buffer, wherein the plurality of sectors of read data are routed from the buffer to a data decoder circuit via the second detector;

the data decoder circuit operable to:

apply a data decoding algorithm to a decoder input derived from the detected output to yield a plurality of processed sectors; and provide the plurality of processed sectors to the controller;

wherein the controller is operable to:

determine if one or more of the processed sectors are failed sectors;

schedule and initiate reprocessing of the failed sectors; and based at least in part upon the size of the track of read data, dynamically determine an amount of space of the buffer which is to be allocated for storing the failed sectors.

10. The system of claim 9, wherein the data detector circuit is a second data detector circuit, wherein the data detection algorithm is a first data detection algorithm, and wherein the system further comprises:

a first data detector circuit connected to the controller and configured to apply a first data detection algorithm to the plurality of sectors of read data to yield a first detected output; and wherein application of the second data detection algorithm is governed based at least in part on the first detected output.

11. The system of claim 10, wherein the first data detector circuit is a loop detector circuit.

12. The system of claim 9, wherein the buffer is a Y-buffer.

13. The system of claim 9, wherein the controller comprises:

a processor and a non-transitory computer readable medium, wherein the computer readable medium includes instructions executable by the processor to:

determine if one or more of the processed sectors are failed sectors;

schedule and initiate reprocessing of the failed sectors; and based at least in part upon the size of the track of read data, dynamically determine an amount of space of the buffer which is to be allocated for storing the failed sectors.

14. The system of claim 9, wherein the controller implements a scheduler for dynamically adjusting the size of the space of the buffer allocated for storing the failed sectors.

15. The system of claim 14, wherein the scheduler assigns a time for reprocessing the failed sectors and initiates the reprocessing of the failed sectors at the assigned time.

* * * * *